(12) United States Patent
Wu et al.

(10) Patent No.: US 10,931,101 B2
(45) Date of Patent: Feb. 23, 2021

(54) ELECTROSTATIC DISCHARGE PROTECTION CIRCUIT

(71) Applicant: REALTEK SEMICONDUCTOR CORPORATION, Hsinchu (TW)

(72) Inventors: Chien-Ming Wu, Zhubei (TW); Jian-Ru Lin, Nantou County (TW); Liang-Huan Lei, Kaohsiung (TW); Cheng-Pang Chan, Zhubei (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 540 days.

(21) Appl. No.: 15/878,817

(22) Filed: Jan. 24, 2018

(65) Prior Publication Data

US 2018/0212422 A1    Jul. 26, 2018

(30) Foreign Application Priority Data

Jan. 25, 2017   (TW) .................................. 106102885

(51) Int. Cl.
| | | |
|---|---|---|
| *H02H 9/00* | (2006.01) | |
| *H02H 9/04* | (2006.01) | |
| *H02H 3/20* | (2006.01) | |
| *H02H 3/04* | (2006.01) | |

(52) U.S. Cl.
CPC .............. *H02H 9/04* (2013.01); *H02H 3/207* (2013.01); *H02H 3/04* (2013.01)

(58) Field of Classification Search
None
See application file for complete search history.

(56) References Cited

U.S. PATENT DOCUMENTS

| | | | |
|---|---|---|---|
| 9,640,988 B2 * | 5/2017 | Ellis-Monaghan .... | H02H 9/046 |
| 9,876,003 B2 | 1/2018 | Chen et al. | |
| 2014/0043036 A1* | 2/2014 | Zhuang .................. | H02H 9/046 |
| | | | 324/537 |

(Continued)

FOREIGN PATENT DOCUMENTS

| | | |
|---|---|---|
| CN | 103412216 A | 11/2013 |
| CN | 104979814 A | 10/2015 |

OTHER PUBLICATIONS

Yan Han et al., Advanced Simulation for ESD Protection Elements, Advances in Solid State Circuit Technologies, Paul K Chu (Ed.), Chapter 10, InTech, DOI: 10.5772/8637.

(Continued)

*Primary Examiner* — Stephen W Jackson
(74) *Attorney, Agent, or Firm* — WPAT, PC (57) ABSTRACT

The present invention discloses an electrostatic discharge (ESD) protection circuit, including: a first terminal configured to receive a first voltage; a second terminal configured to receive a second voltage; a detection voltage generating circuit configured to provide a detection voltage according to the first voltage and the second voltage; a warning circuit configured to generate a control signal according to the detection voltage, in which the control signal indicates a normal condition when the detection voltage satisfies predetermined voltage setting, and the control signal indicates an abnormal condition when the detection voltage does not satisfy the predetermined voltage setting; and a protected circuit configured to carry out a self-protection operation when receiving the control signal indicating the abnormal condition.

18 Claims, 10 Drawing Sheets

(56) References Cited

U.S. PATENT DOCUMENTS

2014/0092507 A1     4/2014   Lefferts et al.
2015/0288173 A1    10/2015   Chen et al.
2017/0324239 A1    11/2017   Tsaur et al.

OTHER PUBLICATIONS

OA letter of the counterpart CN application (appl. No. 201710304938.6) dated Jan. 24, 2019. English Abstract of CN OA letter: Claims 1-10 are unpatentable over the cited reference (Pub. No. CN103412216A) in view of common knowledge.

\* cited by examiner

ELECTROSTATIC DISCHARGE PROTECTION CIRCUIT

BACKGROUND OF THE INVENTION

1. Field of the Invention

The present invention relates to a protection circuit, especially to an ESD protection circuit.

2. Description of Related Art

A conventional electrostatic discharge (ESD) protection circuit is configured to detect voltages at power supply terminals (e.g., a high voltage terminal $V_{DD}$ and a low voltage terminal $V_{SS}$) or configured to detect voltages at a power supply terminal and a ground terminal, so as to enable/disable a protection function accordingly. When an ESD event occurs, the conventional ESD protection circuit discharges to the ground terminal through a path via the power supply terminal; however, such path is usually lengthy and unfavorable to instant discharge. Therefore, the conventional ESD protection circuit needs to be further improved. Related art may be found in the following literature: "Advances in Solid State Circuit Technologies", Chapter 10.

SUMMARY OF THE INVENTION

In view of the problems of the prior art, an object of the present invention is to provide an electrostatic discharge (ESD) protection circuit capable of alerting a protected circuit of an abnormal condition.

The present invention discloses an ESD protection circuit. An embodiment of the ESD circuit comprises a first terminal, a second terminal, a detection voltage generating circuit, a comparing circuit, a control circuit and a protected circuit. The first terminal is configured to receive a first voltage. The second terminal is configured to receive a second voltage. The detection voltage generating circuit is coupled between the first terminal and the second terminal, and configured to provide a detection voltage according to the first voltage and the second voltage. The comparing circuit is configured to generate at least one comparison result(s) according to the detection voltage and at least one reference voltage(s). The control circuit is configured to generate a control signal according to the at least one comparison result(s), in which the control signal indicates a normal condition when the detection voltage does not reach any of the at least one reference voltage(s), and the control signal indicates an abnormal condition when the detection voltage reaches any of the at least one reference voltage(s). The protected circuit is configured to carry out a self-protection operation when receiving the control signal indicating the abnormal condition.

Another embodiment of the aforementioned ESD protection circuit comprises a first terminal, a second terminal, a detection voltage generating circuit, a warning circuit and a protected circuit. The first terminal is configured to receive a first voltage. The second terminal is configured to receive a second voltage. The detection voltage generating circuit is coupled between the first terminal and the second terminal, and configured to provide a detection voltage according to the first voltage and the second voltage. The warning circuit is configured to generate a control signal according to the detection voltage, in which the control signal indicates a normal condition when the detection voltage satisfies predetermined voltage setting, and the control signal indicates an abnormal condition when the detection voltage does not satisfy the predetermined voltage setting. The protected circuit is configured to suspend a normal operation when receiving the control signal indicating the abnormal condition.

A further embodiment of the aforementioned ESD protection circuit comprises a first terminal, a second terminal, a detection voltage generating circuit, a comparing circuit and a control circuit. The first terminal is configured to receive a first voltage. The second terminal is configured to receive a second voltage. The detection voltage generating circuit is coupled between the first terminal and the second terminal, and configured to provide a detection voltage according to the first voltage and the second voltage. The comparing circuit includes: a first inverter configured to generate a first comparison result according to the detection voltage and a predetermined voltage range; and a second inverter configured to generate a second comparison result according to the detection voltage and the predetermined voltage range. The control circuit is configured to generate a control signal according to the first comparison result and the second comparison result, in which the control circuit indicates a normal condition with the control signal when both the first comparison result and the second comparison result indicate the detection voltage is in the predetermined voltage range, and the control circuit indicates an abnormal condition with the control signal when any of the first comparison result and the second comparison result indicates the detection voltage is out of the predetermined voltage range.

These and other objectives of the present invention will no doubt become obvious to those of ordinary skill in the art after reading the following detailed description of the exemplary embodiments that are illustrated in the various figures and drawings.

DETAILED DESCRIPTION OF THE PREFERRED EMBODIMENTS

The following description is written by referring to terms acknowledged in this industrial filed. If any term is defined in the description, such term should be explained accordingly.

The present invention discloses an electrostatic discharge (ESD) protection circuit capable of preventing a protected circuit from being seriously affected by instant signal variation caused by an ESD event (or an event of abnormal energy). The present invention is applicable to many kinds of circuits such as an Ethernet circuit or a circuit requiring ESD protection, and applicable to a circuit using a differential signal; however, the applications of the present invention are not limited to the above-mentioned instances.

Figure 1:
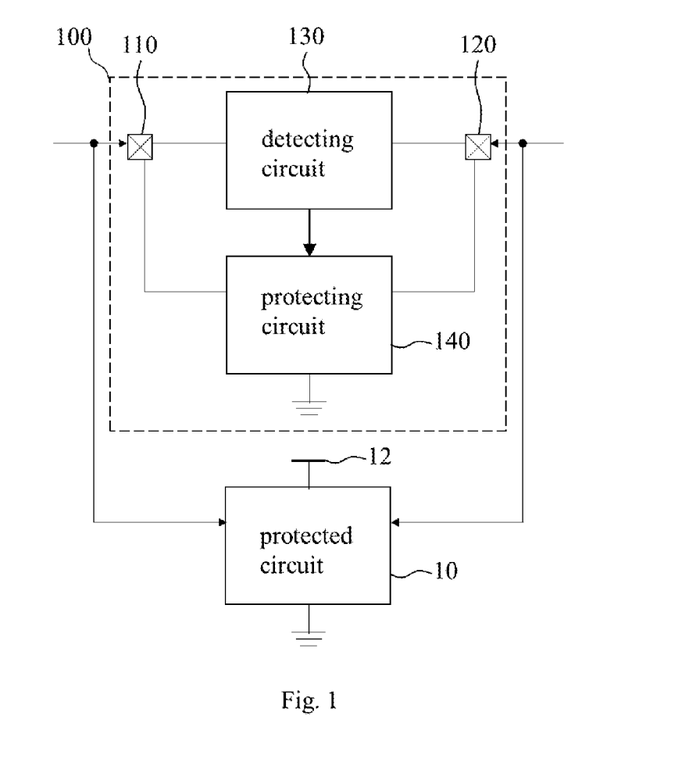
FIG. 1 illustrates an ESD protection circuit.

In view of the problems of a conventional ESD protection circuit as described in the preceding paragraph, Applicant proposes an ESD protection circuit as shown in FIG. 1. The ESD protection circuit 100 of FIG. 1 includes a first terminal 110, a second terminal 120, a detecting circuit 130 and a protecting circuit 140. In addition, a protected circuit 10 is coupled to the first terminal 110 and the second terminal 120 in order to be protected; the protected circuit 10 is further coupled between a power supply terminal 12 and a ground terminal, and receives signals from the first terminal 110 and the second terminal 120.

In light of the above, the protecting circuit 140 is capable of discharging during the occurrence of an ESD event, but the protected circuit 10 may still be affected by instant signal variation caused by the ESD event. Although the protected circuit 10 is unlikely to be damaged under the protection of the ESD protection circuit 100, the protected circuit 10 may crash or malfunction due to the instant signal variation, and have to be restarted or reset for recovering back to a normal operation. For the above-mentioned problems, Applicant further proposes other solutions as described below.

Figure 2:
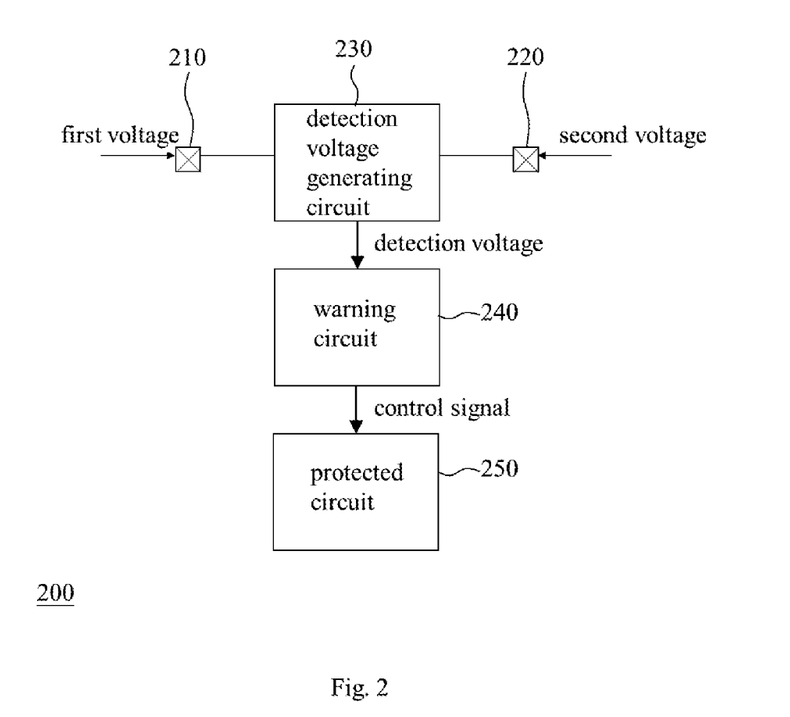
FIG. 2 illustrates an embodiment of the ESD protection circuit of the present invention.
Figure 3:
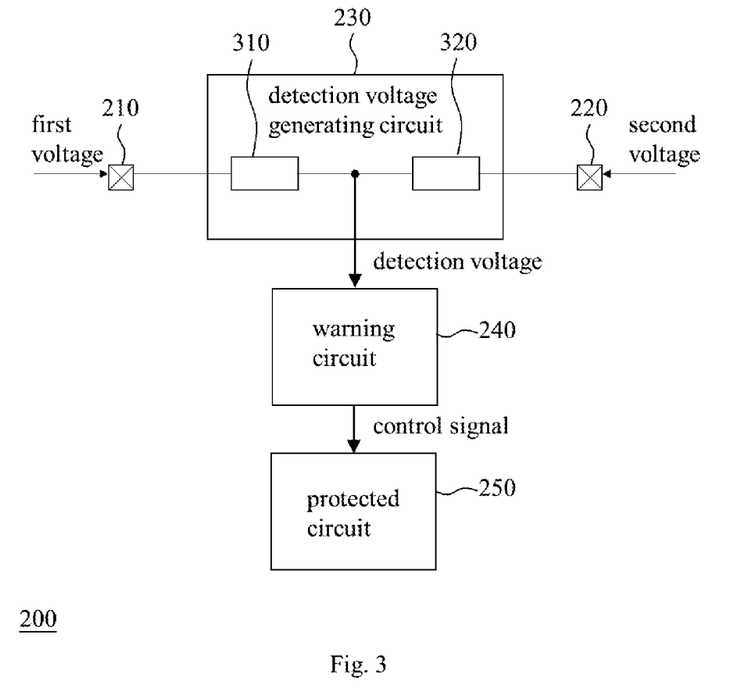
FIG. 3 illustrates an embodiment of the detection voltage generating circuit of FIG. 2.

Please refer to FIG. 2 showing an embodiment of the ESD protection circuit of the present invention. As shown in FIG. 2, the ESD protection circuit 200 includes a first terminal 210, a second terminal 220, a detection voltage generating circuit 230, a warning circuit 240 and a protected circuit 250. The first terminal 210 is configured to receive a first voltage (e.g., the voltage of a positive-end signal of a differential signal), and the second terminal 220 is configured to receive a second voltage (e.g., the voltage of a negative-end signal of a differential signal). The detection voltage generating circuit 230 is coupled between the first terminal 210 and the second terminal 220, and configured to provide a detection voltage according to the first voltage and the second voltage. For instance, the detection voltage generating circuit 230 includes a first impedance 310 (e.g., resistor and/or capacitor) and a second impedance 320 (e.g., resistor and/or capacitor) as shown in FIG. 3, in which the first impedance 310 is coupled between the first terminal 210 and the warning circuit 240 while the second impedance 320 is coupled between the second terminal 220 and the warning circuit 240. When the impedance value of the first impedance 310 is equal to the impedance value of the second impedance 320, the detection voltage is or includes a common mode voltage of the first terminal 210 and the second terminal 220.

Please refer to FIG. 2 again. The warning circuit 240 is configured to generate a control signal according to the detection voltage, in which the control signal indicates a normal condition when the detection voltage satisfies predetermined voltage setting, and the control signal indicates an abnormal condition when the detection voltage does not satisfy the predetermined voltage setting. For instance, the predetermined voltage setting is a predetermined voltage range (e.g., a range defined by a high voltage threshold and a low voltage threshold); when the detection voltage is in the predetermined voltage range (e.g., between a high voltage threshold and a low voltage threshold of the predetermined voltage range), the control signal indicates the normal condition; and when the detection is out of the predetermined voltage range (e.g., above a high voltage threshold of the predetermined voltage range or below a low voltage threshold of the predetermined voltage range), the control signal indicates the abnormal condition for a predetermined time (i.e., predetermined duration). For another instance, the predetermined voltage setting is/are at least one reference voltage(s) (e.g., the upper limit and the lower limit of a voltage range); when the detection voltage does not reach any of the at least one reference voltage(s), the control signal indicates the normal condition; and when the detection voltage reaches any of the at least one reference voltage(s), the control signal indicates the abnormal condition for a predetermined time. The protected circuit 250 is configured to carry out a self-protection operation according to the control signal when it receives the control signal indicating the abnormal condition. For instance, the protected circuit 250 suspends a normal operation (i.e., the operation carried out by the protected circuit 240 under the normal condition) according to the control signal, so as to achieve self-protection. For another instance, the protected circuit 250 suspends the output of a clock that is used for a normal operation, so as to achieve self-protection. Person having ordinary skill in the art can appreciate how to suspend the output of a clock by referring to the Applicant's US patent application of publication number 20160004273.

Figure 4:
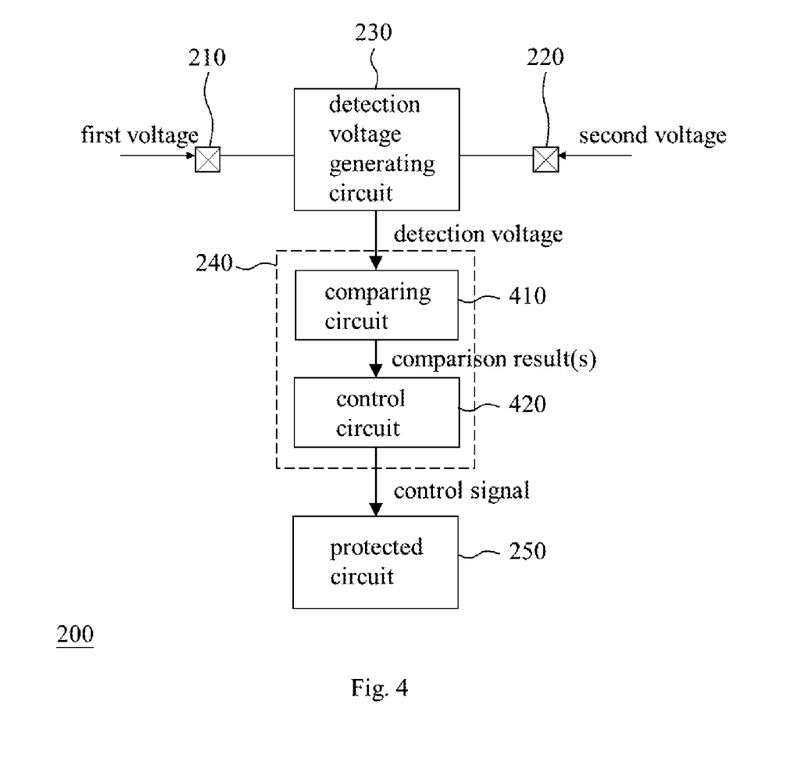
FIG. 4 illustrates an embodiment of the warning circuit of FIG. 2.

Please refer to FIG. 4 showing an embodiment of the warning circuit 240. The warning circuit 240 of FIG. 4 includes a comparing circuit 410 and a control circuit 420. The comparing circuit 410 is configured to generate at least one comparison result(s) according to the detection voltage and the predetermined voltage setting. The control circuit 420 is configured to generate the control signal according to the at least one comparison result(s). An embodiment of the control circuit 420 includes a D flip-flop, a latch circuit, or a circuit composed of logic gates, and is capable of converting the transition(s) of the at least one comparison result(s) into a circuit protection alert for a predetermined time. For instance, if the control circuit 420 includes a D flip-flop (hereafter, DFF), the at least one comparison result(s) is/are inputted to a clock port of the DFF, a warning voltage (e.g., a high voltage) is inputted to a signal input port of the DFF, the voltage at a non-reversed output terminal of the DFF changes from a normal voltage (e.g., a low voltage) to the warning voltage in response to the transition(s) of the at least one comparison result(s), and a reset terminal is configured to reset the voltage of the non-reversed output terminal to be the normal voltage after the voltage at the non-reversed output terminal changes to the warning voltage for the predetermined time. In light of the above, the control circuit 420 is capable of converting the transition(s) of the at least one comparison result(s) into the circuit protection alert for the predetermined time, while the predetermined time can be controlled by a circuit such as a known/self-developed counter or a known/self-developed timer.

Figure 5:
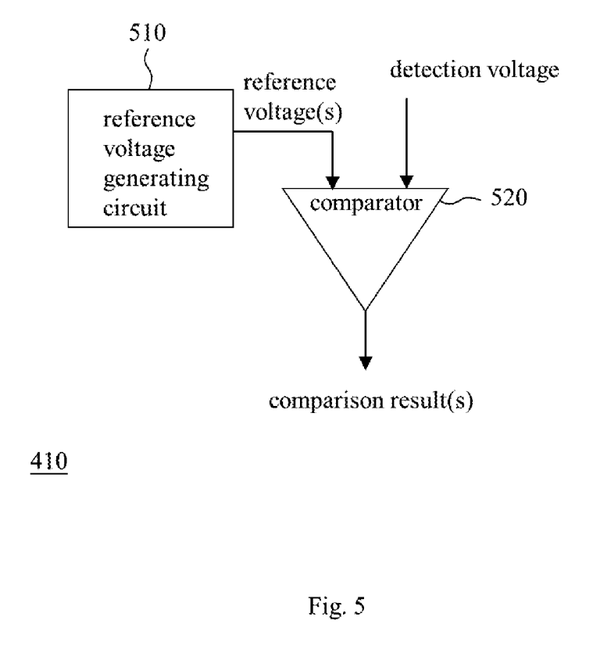
FIG. 5 illustrates an embodiment of the comparing circuit of FIG. 4.

Please refer to FIG. 5 showing an embodiment of the comparing circuit 410. The comparing circuit 410 of FIG. 5 includes a reference voltage generating circuit 510 and a comparator 520. The reference voltage generating circuit 510 includes one or more reference voltage generating unit(s) configured to generate the at least one reference voltage(s). The comparator 520 includes one or more comparing unit(s) configured to compare the detection voltage and the at least one reference voltage(s) so as to generate the at least one comparison result(s). In the embodiment of FIG. 5, each of the reference voltage generating circuit 510 and the comparator 520 alone is a known circuit in this industrial field, and the detail is omitted here.

Figure 6:
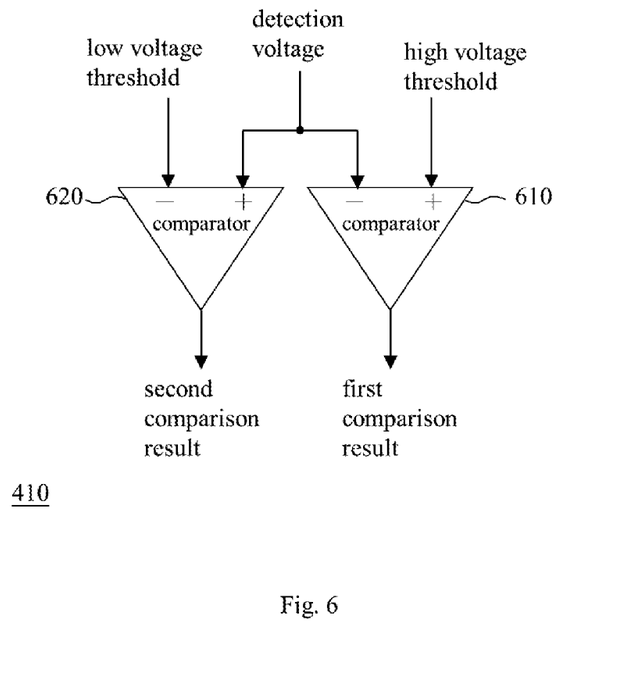
FIG. 6 illustrates another embodiment of the comparing circuit of FIG. 4.
Figure 8:
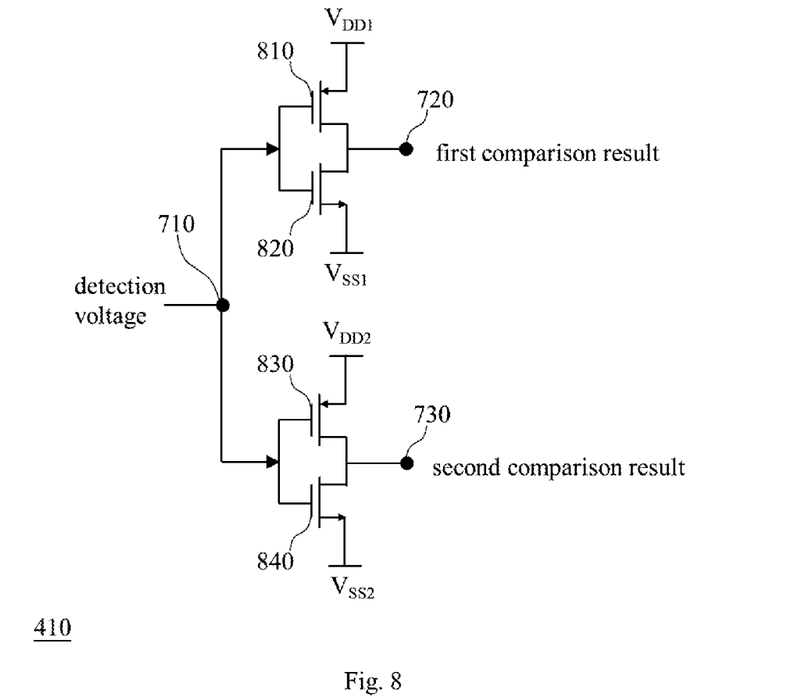
FIG. 8 illustrates an embodiment of the first inverter and the second inverter of FIG. 7.
Figure 9:
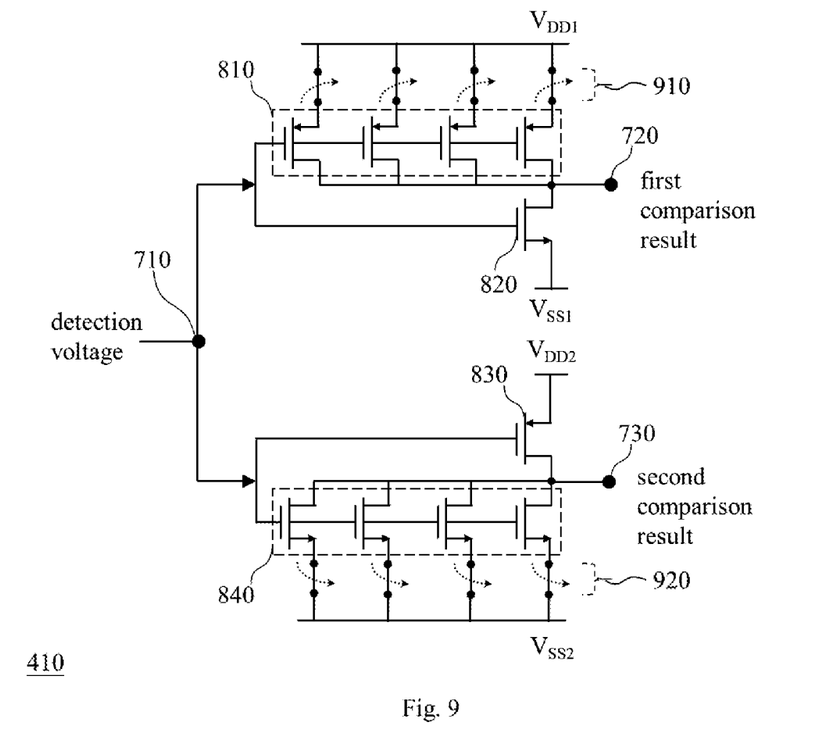
FIG. 9 illustrates another embodiment of the first inverter and the second inverter of FIG. 7.

Please refer to FIG. 6 showing another embodiment of the comparing circuit 410. The comparing circuit 410 of FIG. 6 includes a first comparator 610 and a second comparator 620. The first comparator 610 is configured to generate a first comparison result according to the detection voltage and the predetermined voltage setting; for instance, the predetermined voltage setting includes a high voltage threshold of a predetermined voltage range, and when the detection voltage is lower than the high voltage threshold, the first comparison result indicates the normal condition, in which the high voltage threshold is generated according to the operation voltage of the first comparator 610 (e.g., $V_{DD1}$ and $V_{SS1}$ described in the later paragraph) and the circuit configuration of the first comparator 610 (e.g., the structure as shown in FIG. 8 or FIG. 9). The second comparator 620 is configured to generate a second comparison result according to the detection result and the predetermined voltage condition; for instance, the predetermined voltage setting includes a low voltage threshold of a predetermined voltage range, and when the detection voltage is higher than the low voltage threshold, the second comparison result indicates the normal condition, in which the low voltage threshold is generated according to the operation voltage of the second comparator 620 (e.g., $V_{DD2}$ and $V_{SS2}$ described in the later paragraph) and the circuit configuration of the second comparator 620 (e.g., the structure as shown in FIG. 8 or FIG. 9).

Figure 7:
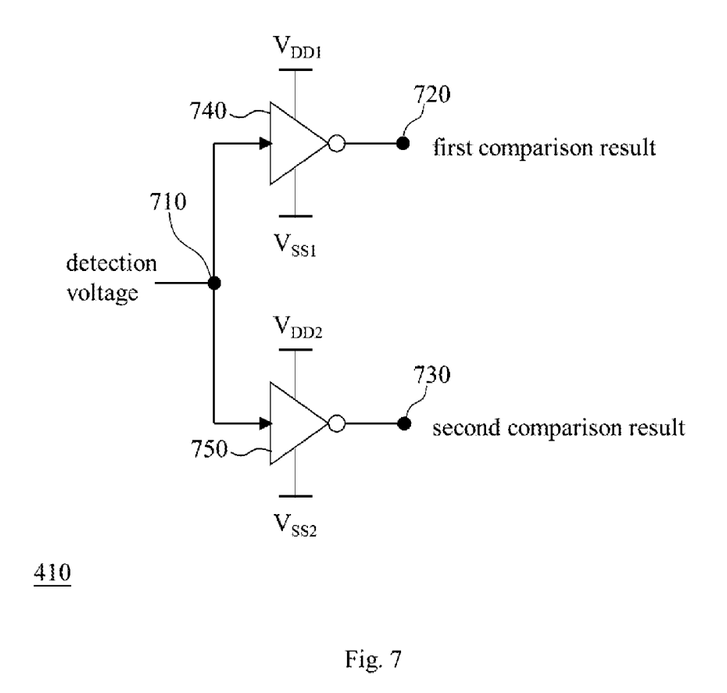
FIG. 7 illustrates an exemplary implementation of the embodiment of FIG. 6.

Please refer to FIG. 7 showing an exemplary implementation of the embodiment of FIG. 6. The comparing circuit 410 of FIG. 7 includes a detection voltage input terminal 710, a first comparison result output terminal 720, a second comparison result output terminal 730, a first inverter 740 and a second inverter 750, in which the detection voltage input terminal 710, the first comparison result output terminal 720 and the first inverter 740 as a whole act as the first comparator 610 of FIG. 6, and the detection voltage input terminal 710, the second comparison result output terminal 730 and the second inverter 750 as a whole act as the second comparator 620 of FIG. 6. The detection voltage input terminal 710 is configured to receive the detection voltage. The first comparison result output terminal 720 is configured to output a first comparison result. The second comparison result output terminal 730 is configured to output a second comparison result. The first inverter is coupled between a first high voltage terminal $V_{DD1}$ and a first low voltage terminal $V_{SS1}$ (e.g., a low-voltage power supply terminal or a ground terminal), and coupled between the detection voltage input terminal 710 and the first comparison result output terminal 720; the first inverter 740 is configured to output the first comparison result according to the detection voltage and a first reference voltage (e.g., a high voltage threshold of a predetermined voltage range), in which the first reference voltage is related to the configuration of the first inverter 740 such as the corresponding configuration of FIG. 8 or the corresponding configuration of FIG. 9. The second inverter 750 is coupled between a second high voltage terminal $V_{DD2}$ (which could be equivalent to or different from the first high voltage terminal $V_{DD1}$) and a second low voltage terminal $V_{SS2}$ (which could be equivalent to or different from the first low voltage terminal $V_{SS1}$), and coupled between the detection voltage output terminal 710 and the second comparison result output terminal 730; the second inverter 750 is configured to output the second comparison result according to the detection voltage and a second reference voltage (e.g., a low voltage threshold of a predetermined voltage range), in which the second reference voltage is lower than the first reference voltage and related to the configuration of the second inverter 750 such as the corresponding configuration of FIG. 8 or the corresponding configuration of FIG. 9.

On the basis of the above, a person having ordinary skill in the art can determine the first and the second reference voltages on her/his own. For instance, the first high voltage terminal $V_{DD1}$ provides a first high voltage, the first low voltage terminal $V_{SS1}$ provides a first low voltage, and the first reference voltage is not lower than the average of the first high voltage and the first low voltage; similarly, the second high voltage terminal $V_{DD2}$ provides a second high voltage, the second low voltage terminal $V_{SS2}$ provides a second low voltage, and the second reference voltage is not lower than the average of the second high voltage and the second low voltage. Those of ordinary skill in the art can appreciate and modify the design of the first and the second reference voltages by referring to the following disclosure of FIG. 8 and FIG. 9.

Please refer to FIG. 8 showing an embodiment of the first inverter 740 and the second inverter 750. In FIG. 8, a first PMOS (p-type metal-oxide-semiconductor) circuit 810 and a first NMOS (n-type metal-oxide-semiconductor) circuit 820 as a whole act as the first inverter 740 of FIG. 7, and a second PMOS circuit 830 and a second NMOS circuit 840 as a whole act as the second inverter 750 of FIG. 7. The first PMOS circuit 810 is physically coupled to the detection voltage input terminal 710, the first high voltage terminal $V_{DD1}$ and the first comparison result output terminal 720; and the first PMOS circuit 810 is configured to electrically connect the first high voltage terminal $V_{DD1}$ and the first comparison result output terminal 720 when the detection voltage is lower than the first reference voltage, so as to output a first high voltage of the first high voltage terminal $V_{DD1}$ as the first comparison result. The first NMOS circuit 820 is physically coupled to the detection voltage input terminal 710, the first low voltage terminal $V_{SS1}$ and the first comparison result output terminal 720; and the first NMOS circuit 820 is configured to electrically connect the first low voltage terminal $V_{SS1}$ and the first comparison result output terminal 720 when the detection voltage is higher than the first reference voltage, so as to output a first low voltage of the first low voltage terminal $V_{SS1}$ as the first comparison result. In addition, the second PMOS circuit 830 is physically coupled to the detection voltage input terminal 710, the second high voltage terminal $V_{DD2}$ and the second comparison result output terminal 730; and the second PMOS circuit 830 is configured to electrically connect the second high voltage terminal $V_{DD2}$ and the second comparison result output terminal 730 when the detection voltage is lower than the second reference voltage so as to output a second high voltage of the second high voltage terminal $V_{DD2}$ as the second comparison result. Furthermore, the second NMOS circuit 840 is physically coupled to the detection voltage input terminal 710, the second low voltage terminal $V_{SS2}$ and the second comparison result output terminal 730; and the second NMOS circuit 840 is configured to electrically connect the second low voltage terminal $V_{SS2}$ and the second comparison result output terminal 730 when the detection voltage is higher than the second reference voltage, so as to output a second low voltage of the second low voltage terminal $V_{SS2}$ as the second comparison result.

Please refer to FIG. 9 showing a modification of the embodiment of FIG. 8. In FIG. 9, the first PMOS circuit 810 includes a plurality of PMOS transistors; these PMOS transistors are coupled to the first high voltage terminal $V_{DD1}$ through a plurality of first switches 910 respectively; and at least one of the first switches 910 is turned on to keep the operation of the first PMOS circuit 810. As a number of turned-on switch(s) of the first switches 910 increases, the first reference voltage increases; in other words, an overall on/off condition of the first switches 910 determines the first reference voltage. In addition, the second NMOS circuit 840 includes a plurality of NMOS transistors; these NMOS transistors are coupled to the second low voltage terminal $V_{SS2}$ through a plurality of second switches 920 respectively; and at least one of the second switches 920 is turned on to keep the operation of the second NMOS circuit 840. As a number of turned-on switch(s) of the second switches 920 increases, the second reference voltage decreases; in other words, an overall on/off condition of the second switches 920 determines the second reference voltage. It should be noted that the numbers of the transistors and the switches of FIG. 9 are exemplary for understanding, not limitations to the scope of the present invention.

According to the embodiment of FIG. 9, the amount of PMOS transistors of the first PMOS circuit 810 is greater than the amount of the NMOS transistor(s) of the first NMOS circuit 820. The amount of the PMOS transistor(s) of the second PMOS circuit 830 is less than the amount of NMOS transistors of the second NMOS circuit 840. However, these relations in amount are not limitations to the present invention. The effects brought by the differences in amount can be achieved in other ways. For instance, an effective transistor channel width of the first PMOS circuit 810 is greater than an effective transistor channel width of the first NMOS circuit 820; and an effective transistor channel width of the second PMOS circuit 830 is less than an effective transistor channel width of the second NMOS circuit 840. Since the control over an effective transistor channel width is well-known in this industrial field, the detail is omitted here.

Figure 10:
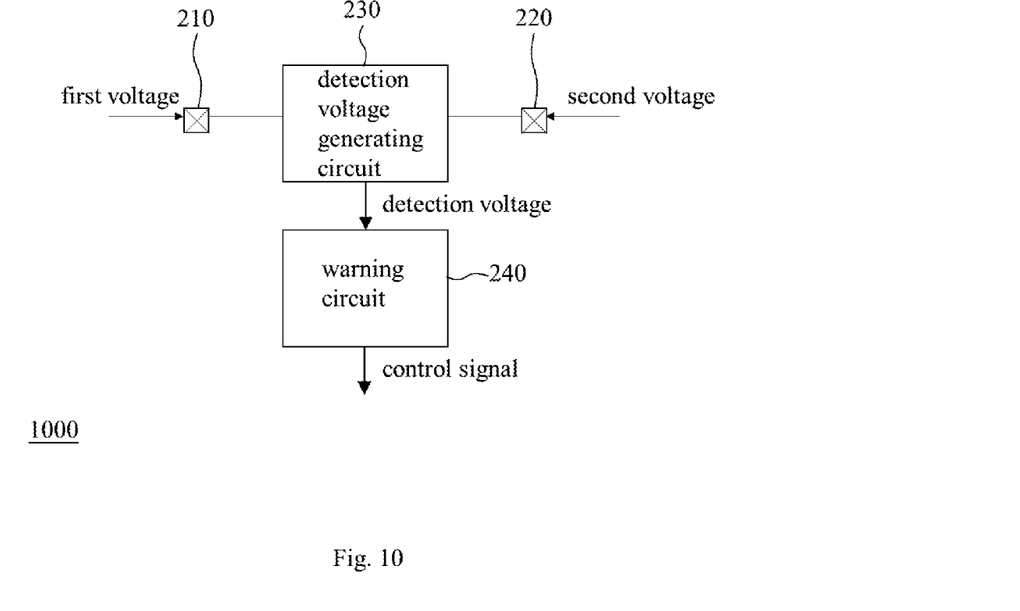
FIG. 10 illustrates another embodiment of the ESD protection circuit of the present invention.

It should be noted that the protected circuit 250 of FIG. 2 can be implemented separately; in other words, as shown in FIG. 10, an ESD protection circuit 1000 of the present invention includes the first terminal 210, the second terminal 220, the detection voltage generating circuit 230 and the warning circuit 240, but excludes the protected circuit 250. Since those of ordinary skill in the art can appreciate the detail and modification of the embodiment of FIG. 10 by referring to the description of the embodiments of FIG. 2 through FIG. 9, which means that the features of the aforementioned embodiments can be applied to the embodiment of FIG. 10 in a reasonable way, repeated and redundant explanation is omitted without failing the written description and enablement requirements. It should be also noted that although the ESD protection circuit of the present invention specializes in sending an alert to notify a protected circuit of an ESD event or a detection of abnormal energy in time, the ESD protection circuit of the present invention can further include an existing/self-developed ESD protection circuit to discharge abnormal energy. An instance of the said existing ESD protection circuit is found in Applicant's Taiwan (R.O.C.) patent application of application number 105114262.

To sum up, the present invention can alert a protected circuit to an ESD event (or a detection of abnormal energy) so that the protected can carry out a self-protection operation in time to prevent/reduce the influence caused by the ESD event (or the abnormal energy). The present invention may focus on altering the protected circuit without discharging abnormal energy, or include an existing/self-developed ESD protection circuit to discharge abnormal energy.

The aforementioned descriptions represent merely the exemplary embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. An electrostatic discharge (ESD) protection circuit, comprising:
    a first terminal configured to receive a first voltage;
    a second terminal configured to receive a second voltage, wherein the first voltage and the second voltage are voltages of two complementary signals of a differential signal;
    a detection voltage generating circuit configured to provide a detection voltage according to the first voltage and the second voltage;
    a comparing circuit configured to generate at least one comparison result(s) according to the detection voltage and at least one reference voltage(s);
    a control circuit configured to generate a control signal according to the at least one comparison result(s), in which the control signal indicates a normal condition when the detection voltage does not reach any of the at least one reference voltage(s), and the control signal indicates an abnormal condition when the detection voltage reaches any of the at least one reference voltage(s); and
    a protected circuit configured to carry out a self-protection operation when receiving the control signal indicating the abnormal condition,
    wherein the control circuit is coupled between the comparing circuit and the protected circuit, and configured to receive the at least one comparison result(s) from the comparing circuit and output the control signal to the protected circuit.

2. The ESD protection circuit of claim 1, wherein the detection voltage generating circuit includes a first impedance and a second impedance, the first impedance is coupled between the first terminal and the comparing circuit, and the second impedance is coupled between the second terminal and the comparing circuit.

3. The ESD protection circuit of claim 2, wherein an impedance value of the first impedance is equal to an impedance value of the second impedance.

4. The ESD protection circuit of claim 1, wherein the comparing circuit includes:
    a reference voltage generating circuit configured to generate the at least one reference voltage(s); and
    a comparator configured to receive the detection voltage and the at least one reference voltage(s) and then generate the at least one comparison result(s).

5. The ESD protection circuit of claim 1, wherein the comparing circuit includes:
    a detection voltage input terminal configured to receive the detection voltage;
    a first comparison result output terminal configured to output a first comparison result;
    a second comparison result output terminal configured to output a second comparison result;
    a first inverter coupled between a first high voltage terminal and a first low voltage terminal and coupled between the detection voltage input terminal and the first comparison result output terminal, and the first inverter configured to output the first comparison result according to the detection voltage and a first reference voltage; and a second inverter coupled between a second high voltage terminal and a second low voltage terminal and coupled between the detection voltage input terminal and the second comparison result output terminal, and the second inverter configured to output the second comparison result according to the detection voltage and a second reference voltage, in which the second reference voltage is lower than the first reference voltage.

6. The ESD protection circuit of claim 5, wherein the first high voltage terminal provides a first high voltage, the first low voltage terminal provides a first low voltage, and the first reference voltage is not lower than an average of the first high voltage and the first low voltage; and the second high voltage terminal provides a second high voltage, the second low voltage terminal provides a second low voltage, and the second reference voltage is not lower than an average of the second high voltage and the second low voltage.

7. The ESD protection circuit of claim 5, wherein the first inverter includes:

a first PMOS circuit physically coupled to the detection voltage input terminal, the first high voltage terminal and the first comparison result output terminal, the first PMOS circuit configured to electrically connect the first high voltage output terminal and the first comparison result output terminal when the detection voltage is lower than the first reference voltage and thereby output a first high voltage of the first high voltage terminal as the first comparison result; and a first NMOS circuit physically coupled to the detection voltage input terminal, the first low voltage terminal and the first comparison result output terminal, the first NMOS circuit configured to electrically connect the first low voltage output terminal and the first comparison result output terminal when the detection voltage is higher than the first reference voltage and thereby output a first low voltage of the first low voltage terminal as the first comparison result; and the second inverter includes:

a second PMOS circuit physically coupled to the detection voltage input terminal, the second high voltage terminal and the second comparison result output terminal, the second PMOS circuit configured to electrically connect the second high voltage output terminal and the second comparison result output terminal when the detection voltage is lower than the second reference voltage and thereby output a second high voltage of the second high voltage terminal as the second comparison result; and a second NMOS circuit physically coupled to the detection voltage input terminal, the second low voltage terminal and the second comparison result output terminal, the second NMOS circuit configured to electrically connect the second low voltage output terminal and the second comparison result output terminal when the detection voltage is higher than the second reference voltage and thereby output a second low voltage of the second low voltage terminal as the second comparison result.

8. The ESD protection circuit of claim 7, wherein a plurality of PMOS transistors of the first PMOS circuit are coupled to the first high voltage terminal through a plurality of first switches respectively, at least one of the first switches is turned on, and a number of turned-on switch(s) of the first switches determines the first reference voltage; and a plurality of NMOS transistors of the second NMOS circuit are coupled to the second low voltage terminal through a plurality of second switches respectively, at least one of the second switches is turned on, and a number of turned-on switch(s) of the second switches determines the second reference voltage.

9. The ESD protection circuit of claim 7, wherein an amount of PMOS transistors of the first PMOS circuit is greater than an amount of NMOS transistor(s) of the first NMOS circuit; and an amount of PMOS transistor(s) of the second PMOS circuit is less than an amount of NMOS transistors of the second NMOS circuit.

10. The ESD protection circuit of claim 7, wherein an effective transistor channel width of the first PMOS circuit is greater than an effective transistor channel width of the first NMOS circuit; and an effective transistor channel width of the second PMOS circuit is less than an effective transistor channel width of the second NMOS circuit.

11. The ESD protection circuit of claim 1, wherein when the at least one comparison result(s) indicate(s) that the detection voltage reaches any of the at least one reference voltage(s), the control signal indicates the abnormal condition for a predetermined time.

12. The ESD protection circuit of claim 1, wherein the protected circuit carries out the self-protection operation by suspending a normal operation.

13. The ESD protection circuit of claim 1, wherein the protected circuit carries out the self-protection operation by suspending an output of a clock.

14. An electrostatic discharge (ESD) protection circuit, comprising:

a first terminal configured to receive a first voltage;
a second terminal configured to receive a second voltage;
a detection voltage generating circuit coupled between the first terminal and the second terminal, and configured to provide a detection voltage according to the first voltage and the second voltage;
a warning circuit configured to generate a control signal according to the detection voltage, in which the control signal indicates a normal condition when the detection voltage satisfies predetermined voltage setting, and the control signal indicates an abnormal condition when the detection voltage does not satisfy the predetermined voltage setting; and
a protected circuit configured to suspend a normal operation when receiving the control signal indicating the abnormal condition,
wherein the predetermined voltage setting is a predetermined voltage range, and the control signal indicates the normal condition when the detection voltage is in the predetermined voltage range, and the control signal indicates the abnormal condition when the detection voltage is out of the predetermined voltage range.

15. The ESD protection circuit of claim 14, wherein the first terminal is configured to receive a positive-end signal of a differential signal and the second terminal is configured to receive a negative-end signal of the differential signal.

16. The ESD protection circuit of claim 14, wherein the predetermined voltage setting is a predetermined voltage range, and the warning circuit includes:

a comparing circuit configured to generate at least one comparison result(s) according to the detection voltage and the predetermined voltage range; and
a control circuit configured to generate the control signal according to the at least one comparison result(s).

17. The ESD protection circuit of claim 16, wherein the comparing circuit includes:
- a first comparator configured to generate a first comparison result according to the detection voltage and a high voltage threshold of the predetermined voltage range; and
- a second comparator configured to generate a second comparison result according to the detection voltage and a low voltage threshold of the predetermined voltage range.

18. An electrostatic discharge (ESD) protection circuit, comprising:
- a first terminal configured to receive a first voltage;
- a second terminal configured to receive a second voltage;
- a detection voltage generating circuit coupled between the first terminal and the second terminal, and configured to provide a detection voltage according to the first voltage and the second voltage;
- a comparing circuit including:
  - a first inverter configured to generate a first comparison result according to the detection voltage and a predetermined voltage range; and
  - a second inverter configured to generate a second comparison result according to the detection voltage and the predetermined voltage range; and
- a control circuit configured to generate a control signal according to the first comparison result and the second comparison result, in which the control circuit indicates a normal condition with the control signal when both the first comparison result and the second comparison result indicate the detection voltage is in the predetermined voltage range, and the control circuit indicates an abnormal condition with the control signal when any of the first comparison result and the second comparison result indicates the detection voltage is out of the predetermined voltage range.

* * * * *